(12) United States Patent
Schumacher et al.

(10) Patent No.: US 9,169,802 B2
(45) Date of Patent: Oct. 27, 2015

(54) CYLINDER HEAD GASKET

(71) Applicant: ElringKlinger AG, Dettingen (DE)

(72) Inventors: Thomas Schumacher, Riederich (DE); Timo Dolde, Kohlberg (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 14/049,521

(22) Filed: Oct. 9, 2013

(65) Prior Publication Data

US 2014/0097575 A1    Apr. 10, 2014

(30) Foreign Application Priority Data

Oct. 10, 2012  (DE) .............................. 102012109646

(51) Int. Cl.
    *F02F 11/00*  (2006.01)
(52) U.S. Cl.
    CPC .................................. *F02F 11/002* (2013.01)
(58) Field of Classification Search
    USPC ................................................. 277/591–596
    See application file for complete search history.

(56) References Cited

U.S. PATENT DOCUMENTS

| | | | | |
|---|---|---|---|---|
| 2,753,199 | A * | 7/1956 | Victor ........................... | 277/592 |
| 3,737,169 | A * | 6/1973 | Glynn ........................... | 277/596 |
| 3,837,657 | A * | 9/1974 | Farnam et al. ................. | 277/312 |
| 3,957,279 | A * | 5/1976 | Belter ........................... | 277/594 |
| 4,213,620 | A * | 7/1980 | Kennedy et al. .............. | 277/596 |
| 4,976,225 | A | 12/1990 | Stang et al. | |
| 5,263,444 | A * | 11/1993 | Prior et al. ................. | 123/195 R |
| 5,322,299 | A * | 6/1994 | Terai ............................. | 277/596 |
| 5,681,048 | A * | 10/1997 | Tronel ........................... | 277/592 |
| 6,173,966 | B1 * | 1/2001 | Noble et al. ................... | 277/596 |
| 6,354,599 | B1 * | 3/2002 | Inamura ......................... | 277/591 |
| 6,371,489 | B1 * | 4/2002 | Combet et al. ................ | 277/594 |
| 6,508,474 | B2 * | 1/2003 | Kinoshita ...................... | 277/592 |
| 6,641,142 | B2 * | 11/2003 | Hegmann et al. ............. | 277/594 |
| 6,719,300 | B2 * | 4/2004 | Fujino et al. .................. | 277/591 |
| 6,848,690 | B1 * | 2/2005 | Hunter .......................... | 277/594 |
| 6,926,282 | B2 * | 8/2005 | Werz et al. .................... | 277/591 |
| 7,086,651 | B2 * | 8/2006 | Zerfass et al. ................ | 277/592 |
| 7,347,176 | B1 * | 3/2008 | Estacio ..................... | 123/196 R |
| 7,887,063 | B2 * | 2/2011 | Rueger et al. ................. | 277/596 |

(Continued)

FOREIGN PATENT DOCUMENTS

| | | |
|---|---|---|
| DE | 1 907 682 | 8/1970 |
| DE | 27 23 576 | 11/1978 |

(Continued)

*Primary Examiner* — Kristina Fulton
*Assistant Examiner* — Eugene G Byrd
(74) *Attorney, Agent, or Firm* — Womble Carlyle Sandridge & Rice, LLP

(57) ABSTRACT

A cylinder head gasket includes a metallic gasket layer having through-openings and, at its peripheral outer margin, a first sealing element for providing a seal. The first sealing element forms a sealing line extending circumferentially about the gasket layer and surrounding the through-openings. The side of the first sealing element facing away from the peripheral outer margin of the gasket layer includes a vent hole arranged adjacent to a sealing line break and located in a first gasket layer region which is, on only a first side of the gasket layer, on both sides of the sealing line break, continuously bounded by the first sealing element and a second sealing element. The first sealing element and the second sealing element extend around the first gasket layer region such that a fluid flow path extending from the sealing line break to the vent hole has at least one change in direction.

24 Claims, 8 Drawing Sheets

(56) References Cited

U.S. PATENT DOCUMENTS

| | | | |
|---|---|---|---|
| 8,157,269 B2 * | 4/2012 | Rueger et al. | 277/596 |
| 8,245,685 B2 | 8/2012 | Reinhart et al. | |
| 2004/0083990 A1 | 5/2004 | Suzuki et al. | |
| 2005/0212219 A1 * | 9/2005 | Langenbach et al. | 277/592 |
| 2005/0269788 A1 * | 12/2005 | Grunfeld | 277/592 |
| 2005/0285353 A1 * | 12/2005 | Rueger et al. | 277/596 |
| 2006/0090714 A1 | 5/2006 | Fricke et al. | |
| 2008/0143056 A1 * | 6/2008 | Dhole et al. | 277/596 |
| 2009/0045590 A1 * | 2/2009 | Ueta et al. | 277/595 |
| 2009/0200751 A1 * | 8/2009 | Widmann | 277/592 |
| 2010/0007095 A1 | 1/2010 | Klinner | |
| 2010/0013220 A1 * | 1/2010 | Rao et al. | 285/368 |
| 2010/0109256 A1 * | 5/2010 | Goettler et al. | 277/592 |
| 2010/0187771 A1 * | 7/2010 | Waltenberg et al. | 277/595 |

FOREIGN PATENT DOCUMENTS

| | | |
|---|---|---|
| DE | 10 2004 010 472 | 9/2005 |
| DE | 10 2006 031 340 | 1/2008 |
| FR | 2 925 642 | 6/2009 |
| WO | WO 99/17039 | 4/1999 |
| WO | WO 03/071119 | 8/2003 |
| WO | WO 2010/072402 | 7/2010 |

* cited by examiner

CYLINDER HEAD GASKET

CROSS-REFERENCE TO RELATED APPLICATIONS

The present disclosure claims priority from, and the benefit under 35 U.S.C. §119, of German application No. 10 2012 109 646.5, filed Oct. 10, 2012, which is incorporated herein by reference in its entirety and for all purposes.

BACKGROUND OF THE INVENTION

The invention relates to a cylinder head gasket and more particularly to a cylinder head gasket for use in relatively large engines (as compared to passenger car engines) and primarily for use in so-called large-scale engines as are employed on trucks, construction machinery and the like and are prone to heavy soiling in use of such vehicles and machines. These large engines can have a single cylinder head that extends over all combustion chambers/cylinders of a cylinder block (also called crankcase) or of a cylinder bank of a V-type engine and a single cylinder head gasket dedicated to said cylinder head or can have a separate cylinder head and a separate cylinder head gasket for each cylinder.

With these engines, the so-called seal gap that exists between the cylinder head and the cylinder block, the latter usually containing cylinder liners, and that is to be sealed by the cylinder head gasket has a relatively large height/width, generally amounting to approximately 1.2 mm to approximately 5 mm, and with an engine presenting such a wide seal gap there is a particularly high risk when the engine is operating or also when it is being cleaned, such cleaning being undertaken frequently and usually using a high-pressure cleaner, of contaminants getting into the seal gap, in particular solid particles such as dust and other dirt, but also liquids such as splashes of water getting on the engine while in operation or splashing water used in engine cleaning and usually having some detergent added thereto. It is therefore necessary for the seal gap to be sealed by the outer perimeter portion of the cylinder head gasket, and for that purpose it is known in the case of a single-layered cylinder head gasket from ElringKlinger AG, i.e., a cylinder head gasket having only a single metallic gasket layer and being configured as a so-called gasket for a single cylinder, to apply in the immediate vicinity of the outer perimeter margin of the gasket layer on each of the two sides thereof an elastomeric sealing element which is in the shape of an elastomeric sealing material bead (so-called sealing lip) and extends around the gasket layer in the immediate vicinity of the outer perimeter margin thereof.

In the case of this known cylinder head gasket, but also in the case of multi-layered metallic cylinder head gaskets incorporating such a gasket layer having peripheral elastomeric sealing elements as well as in the case of correspondingly configured single-layer and multi-layer cylinder head gaskets including several combustion chamber through-openings, there is however the following problem: It cannot be entirely excluded that, when the engine is operating, gas or liquid leakage, albeit small, may occur around one or more combustion chamber through-openings and/or through-openings for cooling water and/or for engine oil and that consequently pressure would build up, induced by said gas or liquid leakage, in the seal gap region which is located between the cylinder head gasket and the cylinder head and/or cylinder block and is enclosed by the peripheral sealing elements if said seal gap region is, on one or both sides of the gasket layer, gas and liquid-tightly sealed, i.e., a sealed to the outside, by use of peripheral, circumferential and endless sealing elements, i.e., sealing elements closed in themselves. Therefore, in the above-mentioned known cylinder head gasket from ElringKlinger AG each of the peripheral elastomeric sealing elements is interrupted at one, i.e., only at one, location—when seen in a plan view of the cylinder head gasket, each of these peripheral elastomeric sealing elements has two end regions which, when viewed from the outer perimeter margin of the gasket layer, overlap each other and extend at an extremely small distance from each other so that said seal gap region is, both between the cylinder head and the cylinder head gasket and between the latter and the cylinder block, open to the outside at that one location, thereby preventing said pressure buildup.

However, this break in each of said peripheral circumferential elastomeric sealing elements is an entrance that, albeit localized, may permit dirt and/or liquid from the outside to get into the areas of the seal gap that are located rearward of the peripheral sealing elements, particularly during an engine cleaning procedure using a high-pressure cleaner.

The present invention aims to at least minimize this problem (object of the invention).

SUMMARY OF THE INVENTION

Thus, the invention starts from and relates to a cylinder head gasket comprising at least one metallic gasket layer that extends at least approximately over the whole cylinder head gasket and has at least one combustion chamber through-opening, at least one fluid through-opening for a liquid medium and bolt holes for passage therethrough of cylinder head bolts and has, in the area of its peripheral outer margin, at least one first sealing element for providing a seal on both sides of the gasket layer, wherein said at least one first sealing element in a plan view of the gasket layer forms, on each of the two sides of the gasket layer, at least one first sealing line extending circumferentially about the gasket layer and surrounding the entirety of the through-openings and holes, and wherein on at least one side of the gasket layer the first sealing line has a break and the first sealing lines are otherwise closed in themselves (the term "sealing line" refers to a more or less line-like, i.e., optionally also strip-like, portion of an elongate sealing element which, with the cylinder head gasket installed, is in contact with and compressed against sealing faces of the cylinder head, the cylinder block or at least one further gasket layer).

To achieve the above-mentioned object, the invention proposes that such a cylinder head gasket be configured such that the gasket layer has, on the side of the at least one first sealing element that faces away from the peripheral outer margin of the gasket layer, at least one vent hole via which the two sides of the gasket layer intercommunicate, and that in a plan view of the gasket layer at least one first vent hole arranged adjacent to a first sealing line break is located in a first gasket layer region which is, on only a first side of the gasket layer, on both sides of the sealing line break, continuously bounded by (at least) one first sealing element and additionally by at least one second sealing element provided on the gasket layer, wherein when viewed in a plan view of the gasket layer, the first sealing element and the at least one second sealing element extend around said first gasket layer region in a course such and the sealing line break is arranged such that (in particular with the cylinder head gasket installed) a fluid flow path extending from the sealing line break to and through the first vent hole has at least one change in direction. In this way, the gasket layer is, in accordance with the invention, provided with a vent and drain device.

The term "vent hole" refers to an opening of the gasket layer through which gases and liquids can pass from one side of the gasket layer to the other side. Analogously, the term "fluid flow path" refers to a passageway along which liquids and gases, namely cooling water, engine oil and combustion gases, can be discharged from the vent hole through the sealing line break out of the seal gap and to the outside. Lastly, the expression "change in direction of the fluid flow path" refers to the fact that, when seen in a plan view of the gasket layer, the fluid flow path takes (at the location of the change in direction), as a result of a curvature or an offset thereof, a course such that a fluid flow flowing along the flow path undergoes a noticeable change in direction, in particular by more than approximately 30°, preferably more than 45° and more preferably by at least 90°.

Finally it should be noted that the first gasket layer region provided with the first vent hole should be continuously bounded, i.e., unbrokenly enclosed, by the combination of the first and the second sealing element (of course as seen in a plan view of the gasket layer), except for the sealing line break, i.e., the only sealing line break for said gasket layer region.

By the at least one peripheral first sealing element preferably forming, on the other, second side of the gasket layer, an unbroken sealing line in the gasket layer region and the vicinity thereof and the two sides of the gasket layer intercommunicating there via the first vent hole, it is possible not only to provide there for pressure balancing between the two sides of the gasket layer but also to at least minimize the risk of intrusion of dirt and liquids there from the outside into the seal gap located within the sealing lines of the at least one peripheral first sealing element that are provided on the two sides of the gasket layer, because such contaminants must pass not only through the fluid flow path having at least one change in direction but also through the approximately 90° change in direction between said flow path and the throughflow direction (axis) of the first vent hole in order to get into the seal gap in the first place (on the first side of the gasket layer, this is prevented by the first and second sealing elements). Advantageously, the course of the flow path has a meander-like pattern when viewed in a plan view of the gasket layer.

While in particularly preferred embodiments of the cylinder head gasket constructed in accordance with the invention, the sealing lines formed on the two sides of the gasket layer by the at least one peripheral first sealing element have a break, namely only a single break, on only a single side of the gasket layer, alternative embodiments will be described below.

The sealing elements, primarily the at least one peripheral first sealing element, could be formed by beads embossed into the metallic gasket layer, but on the grounds that, inter alia, these sealing elements need not afford sealing against the passage of a very hot medium and elastomeric sealing elements, such as elastomeric sealing lips integrally injection-molded on a metallic gasket layer, lend themselves very well to sealing against the passage of liquid media such as cooling water and engine oil, the first, second and yet-to-be-mentioned third sealing elements are, in preferred embodiments of the cylinder head gasket constructed in accordance with the invention, elastomeric sealing elements. The at least one peripheral first sealing element may be an elastomeric sealing element that has been integrally formed, in particular integrally injection-molded, on the outer perimeter edge of the gasket layer and extends over and is raised above both sides (major surfaces) of the gasket layer in order to form a sealing line on each of said sides; alternatively, each side of the gasket layer may, in the outer margin portion thereof or in the immediate vicinity of the outer margin, have an elastomeric sealing element applied thereto, for example through a screen printing process or by injection molding.

Since the first vent hole is sealed therearound (except for the sealing line break) by sealing elements which, with the cylinder head gasket installed, are to be compressed with sufficient firmness against a sealing face adjacent to the gasket layer, it is recommendable for the cylinder head gasket to be configured such that, when the gasket is uncompressed, the first and second sealing elements are at least approximately of the same height, i.e., have at least approximately the same effective height; however, if said sealing elements are of the kind made of an elastomeric material, the effective heights of the sealing elements may also differ, at least within certain limits, since elastomeric sealing elements (unlike metallic beads) may be compressed to a varying extent at the time of assembly of the cylinder head gasket and yet have sufficient capability for sealing.

In order for the fluid flow path to have as many changes in direction as possible, particularly advantageous embodiments of the cylinder head gasket constructed in accordance with the invention are configured such that there is provided in the first gasket layer region, on the first side of the gasket layer, at least one projection which in a plan view of the gasket layer extends from the first and/or the second sealing element and effects a further, at least partial change in direction of the fluid flow, said projection preferably being lower than the first and/or the second sealing element and having a bead-like or rib-like shape.

In order to keep the (central) flow cross-section of the fluid flow path between the gasket layer and a sealing face adjacent thereto and hence the risk of dirt entering from the outside as small as possible, it is recommendable for the gasket layer to be, on the first side thereof, in the first gasket layer region, between the at least one first vent hole and the sealing line break (when viewed in a plan view of the gasket layer), provided with a flat overlay above which the first and the second sealing element project. Said overlay may be for example a thin sheet metal overlay attached to the gasket layer in particular through spot welding, but where the sealing elements consist of elastomeric material it is to be recommended for the overlay also to be made of this material since this then allows for the sealing elements and the overlay to be applied to the gasket layer as a contiguous whole in a single step.

Where the cylinder head gasket has the above-mentioned projection, which effects a further change in direction of the fluid flow, said projection should also project above the overlay mentioned.

Preference is given to embodiments of the cylinder head gasket constructed in accordance with the invention that have a preferably groove-like fluid flow channel which is formed by the overlay and which, when seen in a plan view of the gasket layer, has at least one change in direction. In this way, it is possible to ensure that the vent and drain device constructed in accordance with the invention remains operable even if foreign matter, such as dirt, has accumulated on the overlay over time.

The above-mentioned and in particular rib-like projection not only causes a partial change in direction of the fluid flow flowing through the fluid flow path if (when seen in a plan view of the gasket layer) a change in direction of the flow path is adjacent to a free end of the projection, but also forms a kind of impact wall to be encountered by splashing water on entering through the sealing line break from the outside, and hence provides protection against splashing water, if (when seen in a plan view of the gasket layer) the projection is approximately transverse (not necessarily perpendicular) to the part of the fluid flow path that would otherwise extend between the first vent hole and the sealing line break in the absence of said projection.

In order for the vent and drain device constructed in accordance with the invention to require as little space as possible (when seen in a plan view of the gasket layer), preference is given to embodiments in which the first vent hole is directly adjacent to the first peripheral sealing element.

Cylinder head gaskets for commercial vehicle engines and large-scale engines frequently are single-layered gaskets and/or are configured, as has already been mentioned, as gaskets for a single cylinder having only a single combustion chamber through-opening. In the case of larger and large-scale engines, an annular metallic combustion chamber sealing element is inserted in the metallic gasket layer for the one, or each, combustion chamber/cylinder and is secured in the gasket layer, said combustion chamber sealing element then forming the actual combustion chamber through-opening of the gasket layer. In the case of engines having cylinder liners inserted in the cylinder block which project somewhat above the upper end face of the cylinder block, it is however also known to clamp the sheet metal of the gasket layer between the upper end face of a cylinder liner and the sealing face of the cylinder head so that the gasket layer itself provides for sealing about the combustion chamber/cylinder.

However, the present invention is also suitable for use in multi-layered cylinder head gaskets which have, in addition to the gasket layer provided with the vent and drain device constructed in accordance with the invention, one or more further metallic gasket layers, for example two metallic cover layers having the gasket layer configured in accordance with the invention interposed therebetween.

In a cylinder head gasket constructed in accordance with the invention and intended for use in an in-line engine or a V-type engine having two multiple cylinder-type cylinder banks or two multiple cylinder-type cylinder blocks, it is to be recommended for the sealing elements of the vent and drain device constructed in accordance with the invention to be provided on the bottom side of the gasket layer (the side intended to face towards the cylinder block) in order to provide for particularly good drainage of any liquids that may leak into the seal gap while the engine is operating, and since in the case of a V-engine the sealing faces of the cylinder banks against which the cylinder head gaskets are in contact are angled from horizontal, it is in any case advantageous for the vent and drain device constructed in accordance with the invention to be arranged in the area of the margin of the cylinder head gasket that is located at the lowest level when the gasket is assembled.

It is in principle possible, albeit not particularly advantageous, for a cylinder head gasket constructed in accordance with the invention to have a plurality of vent and drain devices constructed in accordance with the invention provided on one side of the gasket layer. Where a cylinder head gasket constructed in accordance with the invention is, for whatever reason, to be provided with a plurality of vent and drain devices, preference is however to be given to configurations that are distinguished in that the gasket layer in a plan view thereof has a second gasket layer region which is spaced apart from the first gasket layer region and in which at least one second vent hole of the gasket layer is located, in that on the other, second side of the gasket layer, the sealing line of the at least one first sealing element is not endless and closed in itself but also has a sealing line break, namely a second sealing line break, to which the second vent hole is preferably adjacent, and in that the second gasket layer region is, on only the second side of the gasket layer, on both sides of the second sealing line break, continuously bounded by a first sealing element and at least one third sealing element provided on the second side of the gasket layer, wherein in a plan view of the second side of the gasket layer the first sealing element and the at least one third sealing element extend around the second gasket layer region in a course such and the second sealing line break is arranged such that a fluid flow path extending from the second sealing line break to the second vent hole has at least one change in direction.

All of what has been said above with reference to the first vent and drain device constructed in accordance with the invention is then preferably equally applicable to the thus-configured second vent and drain device constructed in accordance with the invention.

As will become apparent from the following description of the preferred embodiments of the cylinder head gasket constructed in accordance with the invention and illustrated in the accompanying drawings, it is advantageous for the gasket layer to be provided with at least one further vent hole outside of the gasket layer region bounded by sealing elements, said further vent hole being located within the part of the gasket layer that is enclosed by the at least one first sealing element in order to facilitate even better intercommunication between the two sides of the gasket layer. However, such a further vent hole operates no direct venting and/or draining effect of the seal gap.

Other features, details and advantages of the invention will become apparent from the following description of the preferred embodiments illustrated in the appended drawings.

DETAILED DESCRIPTION OF THE INVENTION

Figure 1:
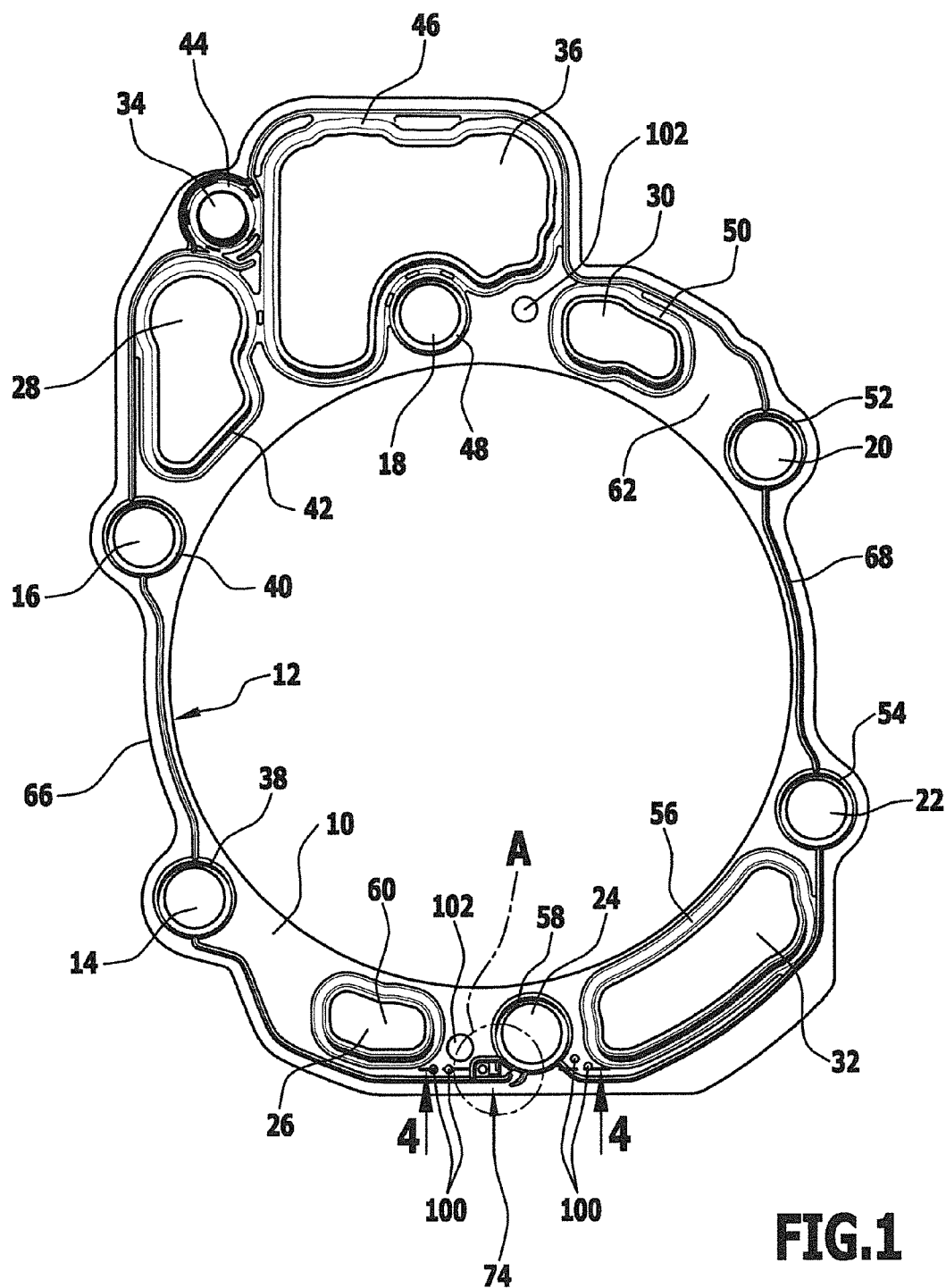
FIG. 1 is a plan view of the bottom side of a single-layered cylinder head gasket configured as a gasket for a single cylinder, constructed in accordance with the invention, which bottom side is intended to face towards a cylinder block at the time of gasket assembly.
Figure 2:
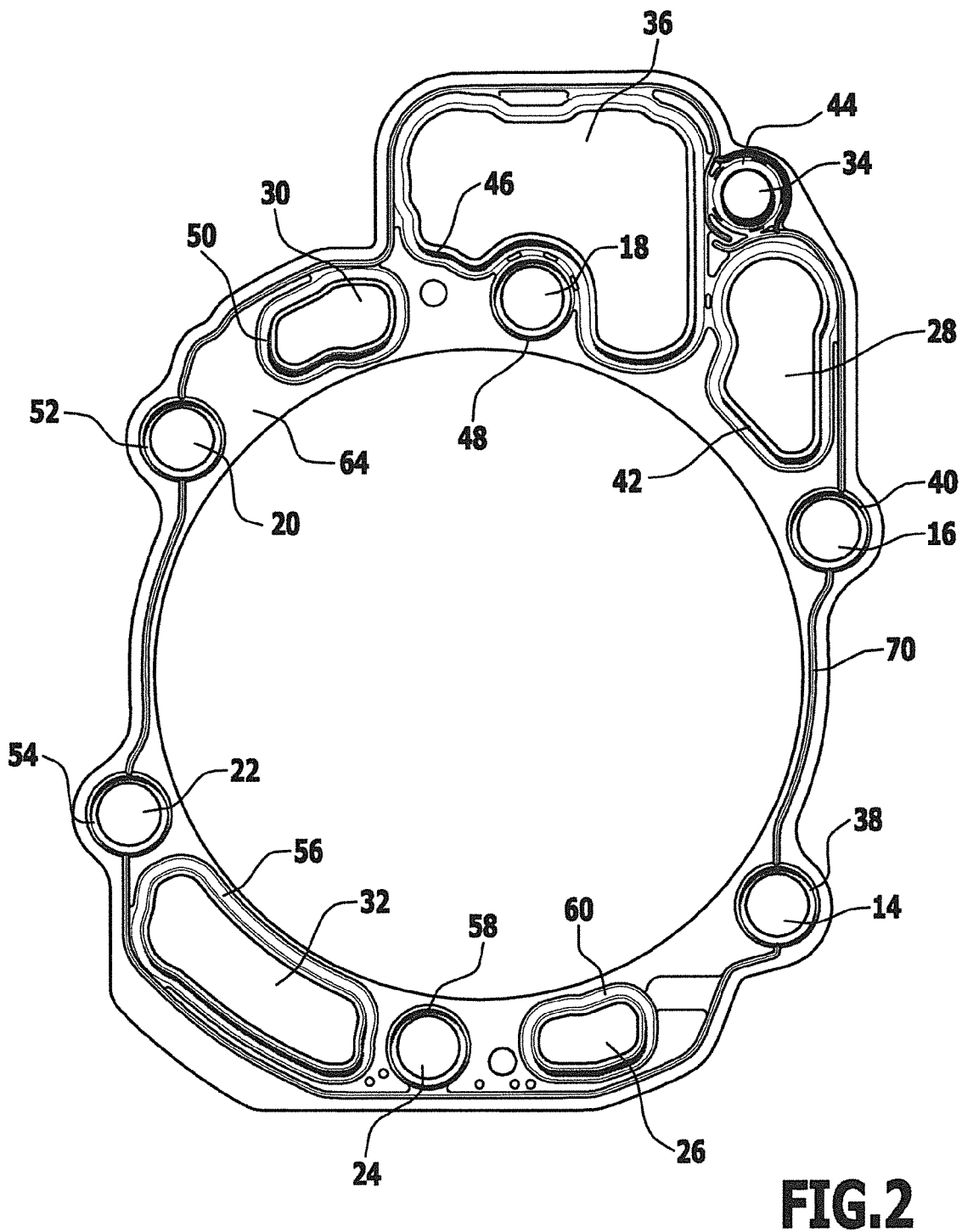
FIG. 2 is a plan view of the top side of this cylinder head gasket.

The cylinder head gasket illustrated in FIGS. 1 and 2 has a metallic gasket layer 10 made of a steel sheet, and in the present first embodiment of the cylinder head gasket constructed in accordance with the invention the gasket layer 10 is a smooth and generally planar steel layer having the following through-openings and holes: a combustion chamber through-opening 12 associated with a cylinder or a combustion chamber of an engine, bolt holes 14, 16, 18, 22 and 24 for passage therethrough of cylinder head bolts, cooling water through-openings 26, 28, 30 and 32, a pressurized oil through-opening 34 for passage therethrough of pressurized engine oil, and a through-opening 36 for passage therethrough of pushrods of the engine for valve actuation and of engine oil return flow from a cylinder head to a cylinder block of the engine.

These bolt holes 14 to 24 and through-openings 26 to 36 are all provided with elastomeric sealing elements 38, 40, 42, 44, 46, 48, 50, 52, 54, 56, 58 and 60 which in the illustrated embodiment were integrally injection-molded to the hole or opening margins of the gasket layer 10 and were then fully cured and which are also extended to both sides, i.e., the two major surfaces of the gasket layer 10, far enough that when viewed in plan views of the two sides of the gasket layer 10, each sealing element forms a strip bordering the corresponding hole or through-opening (refer to FIGS. 1 and 2), wherein each of said strips has, in a manner known per se, an approximately rib-like so-called sealing lip which projects from the corresponding side of the gasket layer 10 and surrounds the corresponding hole or through-opening in a closed manner It is, however, also possible for said elastomeric sealing elements to be applied to the metallic gasket layer 10 using any other method known from the state of the art, in particular by screen printing, in which case the elastomeric material could then also be applied leaving clear the edges of the metallic gasket layer 10 that surround said holes and through-openings—it is only in this case that the hole or the through-opening as punched out of the metallic gasket layer 10 exhibits the hole or through-opening cross-section that is given in the finished gasket, whereas said cross-section is somewhat smaller when the elastomeric material also covers the edges of the metallic gasket layer 10 that surround the holes and through-openings.

The same applies analogously to the combustion chamber through-opening 12 for which the cylinder head gasket illustrated in FIGS. 1 and 2 has no sealing element. In this single-layered cylinder head gasket, the combustion chamber through-opening 12 illustrated in FIGS. 1 and 2 could have inserted therein a circular ring-shaped combustion chamber sealing element whose inside diameter corresponds to the bore diameter of the associated combustion chamber or the associated cylinder and which, with the cylinder head gasket installed, is clamped between the sealing faces of a cylinder head and the cylinder block or a cylinder liner residing in the latter. However, in the case of an engine equipped with cylinder liners in which the cylinder liners protrude slightly past the upper end face of the cylinder block, as is especially the case with truck engines and other large-scale engines, an in particular circular ring-shaped combustion chamber sealing element constituting a part separate from the cylinder head gasket can also be placed atop the cylinder liner such that it is sealingly clamped between the cylinder liner and the cylinder head when the engine is assembled.

Hereinafter, the side of the metallic gasket layer 10 shown in FIG. 1 (that is the underside thereof in the present case) will be designated as a first side 62 thereof, whereas the other side of the gasket layer 10, shown in FIG. 2, will be designated as a second side 64 thereof.

In the first embodiment of the cylinder head gasket constructed in accordance with the invention and illustrated in FIGS. 1 and 2, the metallic gasket layer 10 has, at an extremely small distance from its outer perimeter margin 66, on each of its first side 62 and second side 64 a bead-like elastomeric sealing element 68 and 70 respectively which has been applied to the gasket layer 10 for example by screen printing and as such could extend around the gasket layer 10 near the outer perimeter margin 66 thereof, thus forming a peripheral sealing element; however, in the embodiment illustrated in FIGS. 1 and 2, also portions of the elastomeric sealing elements 38, 40, 52, 54 and 58 (but optionally also parts of the elastomeric sealing elements 42, 44, 46, 50 and 56) participate in forming such a peripheral sealing element.

The first embodiment shown in FIGS. 1 and 2 can, however, also be modified in the following two ways: On each side of the gasket layer 10, a first elastomeric sealing element 68 and 70 respectively formed by a plurality of partial elements is replaced by a single, continuous, more or less line-like first elastomeric sealing element which extends circumferentially about the gasket layer 10 near the outer perimeter margin 66 thereof and is of approximately bead-like configuration; alternatively, the outer perimeter margin 66 can have integrally molded thereon, in particular integrally injection-molded thereon, a single elastomeric sealing element which extends circumferentially about the gasket layer 10 and is extended also to the two layer sides 62 and 64 so as to cover both the edge of the gasket layer 10 at the outer perimeter margin 66 thereof and in each case a narrow margin strip of the two layer sides 62 and 64 adjoining the outer perimeter margin 66, in each case forming a sealing bead thereon.

In all cases, peripheral sealing of the seal gap that exists between the sealing faces of the cylinder block and a cylinder head facing towards each other and that is to be sealed by the cylinder head gasket is thus ensured on both sides of the cylinder head gasket.

As may be seen from FIGS. 1 and 2, the first embodiment of the cylinder head gasket constructed in accordance with the invention has, on the second side 64 of the gasket layer 10, the elastomeric sealing element 70 extending circumferentially about the cylinder head gasket as an endless sealing element that is closed in itself, while the first elastomeric sealing element 68 provided on the first layer side 62 is interrupted at the location of a vent and drain device 74 constructed in accordance with the invention but otherwise surrounds the cylinder head gasket without interruption, i.e., continuously.

Since each of the first elastomeric sealing elements 68 and 70, with the cylinder head gasket assembled, is compressed against sealing faces of a cylinder block and a cylinder head and thereby forms a more or less line-like or strip-like so-called sealing line, said sealing line is thus endless and closed in itself on the second layer side 64 of the cylinder head gasket while having a break (sealing line break) in the area of the vent and drain device 74 on the first layer side 62.

The vent and drain device 74 that is primarily provided on the first side 62 of the gasket layer 10 will now be described in greater detail below.

Figure 3:
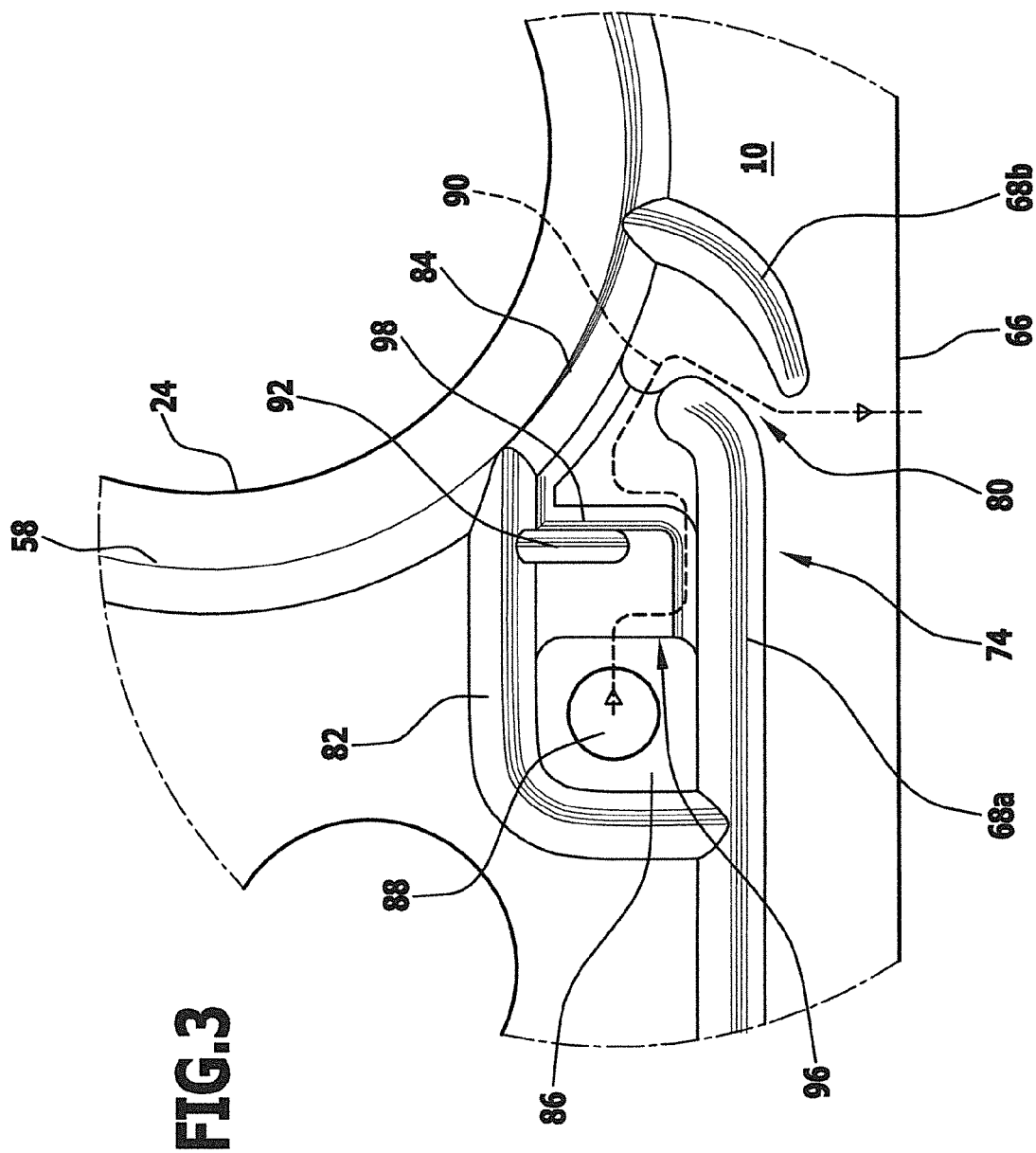
FIG. 3 shows detail "A" of FIG. 1 on an enlarged scale.

As is particularly clearly apparent from FIG. 3, the peripheral first sealing element 68 has, at said vent and drain device 74, a break and hence a sealing line break 80 between two end regions 68a and 68b of the sealing element 68; alternatively, however, the sealing element 68 could be not completely interrupted at that location but only reduced in its height or thickness so that the sealing line formed by the ridge of the rib-like or bead-like sealing element 68 has a break at that location.

As will become apparent hereinafter, it is advantageous for the end regions 68a and 68b of the sealing element 68, seen from the outer perimeter margin 66 of the gasket layer 10, to overlap such that the longitudinal direction of the gap formed by these two end regions and hence the longitudinal direction of the channel formed by the sealing line break 80 is not perpendicular, and not even nearly perpendicular, to the adjacent area of the outer perimeter margin 66 of the gasket layer 10 but is at an acute angle to or at least approximately parallel to the adjacent outer perimeter margin portion (as seen in a plan view of the cylinder head gasket) in order to thus minimize the risk that splashes of water or other contaminants which impinge on the outside of the engine can pass through the sealing line break 80.

The vent and drain device 74 constructed in accordance with the invention further includes, besides the end regions 68a and 68b of the first elastomeric sealing element 68, a second elastomeric sealing element 82, 84 which in the first embodiment illustrated in FIGS. 1 to 3 is formed by a continuous sealing bead or sealing rib 82 which is made of elastomeric material and applied to the first layer side 62, and a portion 84 of the elastomeric sealing element 58, which encloses the bolt hole 24; in the first embodiment, the sealing bead or sealing rib 82 merges into the elastomeric sealing elements 68 and 58, and it is preferred for at least the two end regions 68a and 68b of the sealing element 68, the sealing bead or sealing rib 82 and the elastomeric sealing element 58 to be of the same height or thickness.

In accordance with the invention, the end regions 68a and 68b of the sealing element 68, the sealing bead or sealing rib 82 and the portion 84 of the elastomeric sealing element 58 (as seen in a plan view of the cylinder head gasket) enclose a first gasket layer region 86 of the metallic gasket layer 10 completely and unbrokenly except for the sealing line break 80, and the gasket layer 10 has, in the gasket layer region 86, a first vent hole 88 by way of which the two sides 62 and 64 of the gasket layer 10 communicate with each other.

The first embodiment of the cylinder head gasket constructed in accordance with the invention and depicted in FIGS. 1 to 3 can, however, also be modified such that the gasket layer region 86 containing the vent hole 88 is enclosed by a combination of the two end regions 68a and 68b and a second elastomeric sealing element which is not subdivided into portions, i.e., is continuous (except for the sealing line break 80 and when seen in a plan view of the gasket layer 10).

Since the vent hole 88 is, in accordance with the invention, spaced apart from the sealing line break 80 and arranged transverse to the above-defined longitudinal direction of the sealing line break 80, at a distance from the latter, there results a fluid flow path 90 having several changes in direction as indicated in FIG. 3 by a line and two arrows for venting and/or draining the seal gap between the second side 64 of the gasket layer 10 and the sealing face of the cylinder block or cylinder head adjacent to said layer side: Gases and/or liquids escaping from the above-defined seal gap undergo a first sharp change of direction which redirects the flow initially travelling approximately parallel to the gasket layer 10 to travelling approximately in the direction of the axis of the vent hole 88, whereupon the flow undergoes another sharp change in direction due to the sealing face of the cylinder block or cylinder head adjacent to the first side 62 of the gasket layer 10; lastly, at the outlet end of the fluid flow path 90, there is another sharp change in direction redirecting the flow approximately in the longitudinal direction of the sealing line break 80.

In preferred embodiments of the invention, there is provided within the first gasket layer region 86, which is enclosed, except for the sealing line break 80, by the first elastomeric sealing element 68 and the second sealing element 82, 84, a projection 92 which is preferably of approximately rib-like configuration and whose ridge or crest is in particular at a lesser distance from the first side 62 of the gasket layer 10 than are the crests of the sealing elements 68 and 82, 84; said projection is in accordance with the invention configured and arranged (when viewed in a plan view of the gasket layer 10) so as to cause a further directional change of at least a portion of the fluid flow so that, when viewed in a plan view of the vent and drain device 74, the course of the fluid flow path 90 results in a more or less meander-like pattern between the vent hole 88 and the sealing line break 80.

Figure 4:
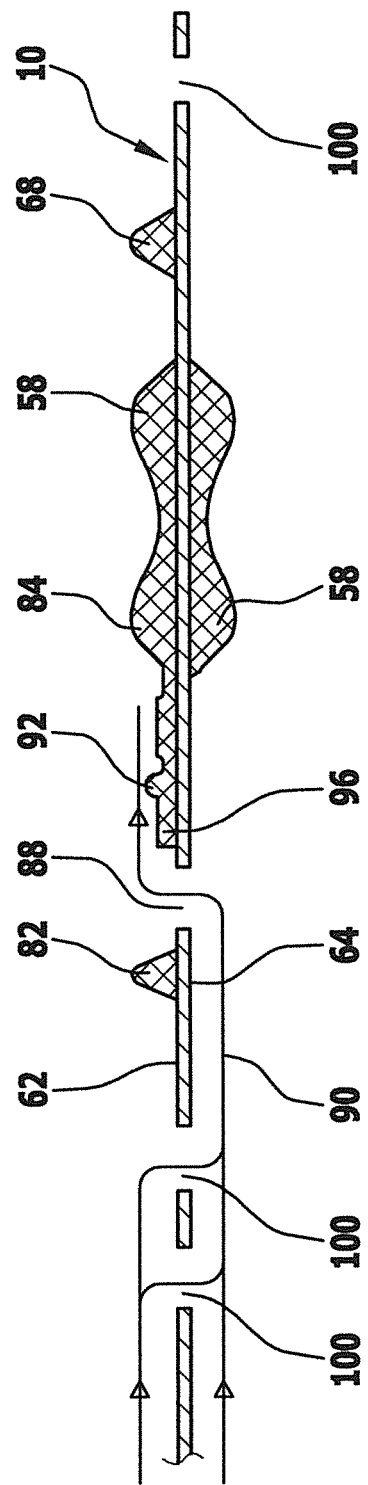
FIG. 4 shows a section through the cylinder head gasket taken along line 4-4 in FIG. 1.

As may be seen from FIGS. 3 and 4, the gasket layer 10 is, on the first side 62 of the gasket layer 10, in the first gasket layer region 86, between the vent hole 88 and the sealing line break 80, provided with a flat overlay 96 above which project the first and second sealing elements 68 and 82, 84 respectively but also the projection 92. The overlay 96 causes the cross-sectional flow area between the first layer side 62 and the sealing face of the cylinder block or cylinder head adjacent thereto to be reduced over part of the gasket layer region 86, thus further minimizing the risk that liquids or other contaminants which impinge on the engine from the outside can penetrate to the vent hole 88.

As may be seen from FIGS. 1 to 3, it is also possible for the sealing elements 68 and 82, 84, which form a boundary of the first gasket layer region 86, to be applied to the gasket layer 10 conjointly with the overlay 96 and/or the projection 92 as a contiguous unit in a single step, thereby minimizing the risk of one or more of these elements detaching from the gasket layer 10 during engine operation.

In accordance with a further feature of the invention, the overlay 96 has integrally formed therein a fluid flow channel 98 having several changes in direction, namely two changes in direction in the present case, and said fluid flow channel 98 may be in the shape of a groove integrally formed in the overlay 96 or a channel-like interruption of the overlay 96. The fluid flow channel 98 is advantageous in that the vent and drain device 74 constructed in accordance with the invention remains operable even if deposits were to accumulate on the overlay 96 in the course of engine operation.

As shown in FIGS. 1 and 2, the cylinder head gasket constructed in accordance with the invention has, in the gasket layer 10, outboard of the vent and drain device 74 but inboard of the first elastomeric sealing elements 68 and 70 (as seen from the outer perimeter margin 66 of the gasket layer), at least one, preferably several, further vent holes 100 in order that in the first embodiment shown leakage gases and leakage liquids may pass from the seal gap between the first side 62 of the gasket layer 10 and the sealing face of the cylinder block or cylinder head adjacent to said layer side to the seal gap on the second side 64 of the gasket layer 10 and from thence escape to the outside via the first vent hole 88 and the vent and drain device 74.

Furthermore, also shown in FIGS. 1 and 2 are two so-called positioning holes 102 by which, together with so-called positioning pins in the cylinder block and/or cylinder head, the cylinder head gasket can be properly and precisely positioned and fixed in place between these two engine components.

If the cylinder head gasket depicted in FIGS. 1 to 4 is integrated in a V-type engine in which the sealing faces of the two cylinder blocks or cylinder banks by which the cylinder head gaskets are supported are inclined at an angle to the horizontal, it is to be recommended in consideration of good drainage of the seal gap(s) that the cylinder head gasket shown in FIGS. 1 and 2 be installed such that the vent and drain device 74 constructed in accordance with the invention faces towards the sealing face of the respective cylinder block (although this is also to be recommended for cylinder head gaskets for use on an in-line engine) and is located on the long side of the corresponding cylinder block sealing face that is at a lower level than the other cylinder block long side.

However, if desired, a cylinder head gasket constructed in accordance with the invention can also have yet a second vent and drain device which corresponds to the vent and drain device 74 and is located approximately opposite thereto relative to the combustion chamber through-opening 12, i.e., for example between the bolt hole 20 and the through-opening 30 in the case of the cylinder head gasket illustrated in FIGS. 1 and 2; however, it is to be recommended for said second vent and drain device to be provided on the second side 64 of the gasket layer 10.

Figure 5:
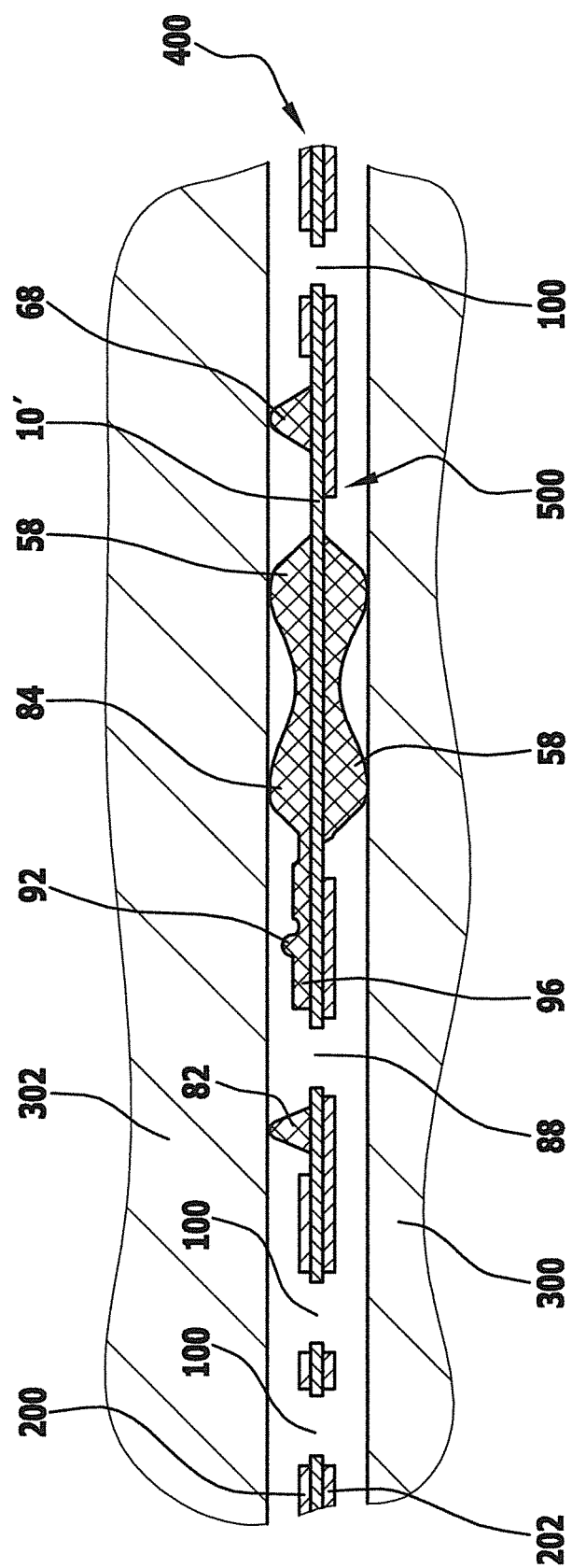
FIG. 5 is a section in a view corresponding to FIG. 4, taken through a second embodiment of the cylinder head gasket constructed in accordance with the invention, but differing from the first embodiment depicted in FIGS. 1 to 4 in that the second embodiment is multi-layered, namely comprising a gasket plate having three gasket layers.

With reference to FIG. 5, it will be shown that the invention can also be implemented on a multi-layered cylinder head gasket.

FIG. 5 shows in a view corresponding to FIG. 4 a section taken through such a multi-layered, namely three-layered, metallic cylinder head gasket in which a gasket layer 10', provided correspondingly to the gasket layer 10 of the first embodiment and in accordance with the invention with elastomeric sealing elements and a vent and drain device, is arranged between a second metallic gasket layer 200 and a third metallic gasket layer 202.

Indicated in FIG. 5 are a cylinder block 300 and a cylinder head 302, namely the areas of the cylinder block and cylinder head that face towards the cylinder head gasket and have sealing faces, these being illustrated in FIG. 5 in a condition in which the cylinder head bolts have not yet been tightened and, as a consequence, compression of the elastomeric elements of the cylinder head gasket has not yet been effected. Therefore, the seal gap that exists between the sealing faces of the cylinder block and cylinder head and which is to be sealed by the cylinder head gasket, generally indicated at 400, and hence the seal gap regions lying above and beneath said cylinder head gasket are still of a greater height or width than they are after the cylinder head bolts have been tightened.

In the cylinder head gasket 400 illustrated in FIG. 5, the two cover layers 200 and 202 have cutouts for the passage therethrough of all the elastomeric sealing elements integrally formed on the gasket layer 10' so that these are compressed against the sealing face of the cylinder block 300 or the sealing face of the cylinder head 302 when the cylinder head gasket is installed.

All of what has been said above with reference to the first embodiment of a cylinder head gasket constructed in accordance with the invention and illustrated in FIGS. 1 to 4 is applicable also to the cylinder head gasket 400 shown in FIG. 5, to the extent that this is expedient and possible.

Figure 6:
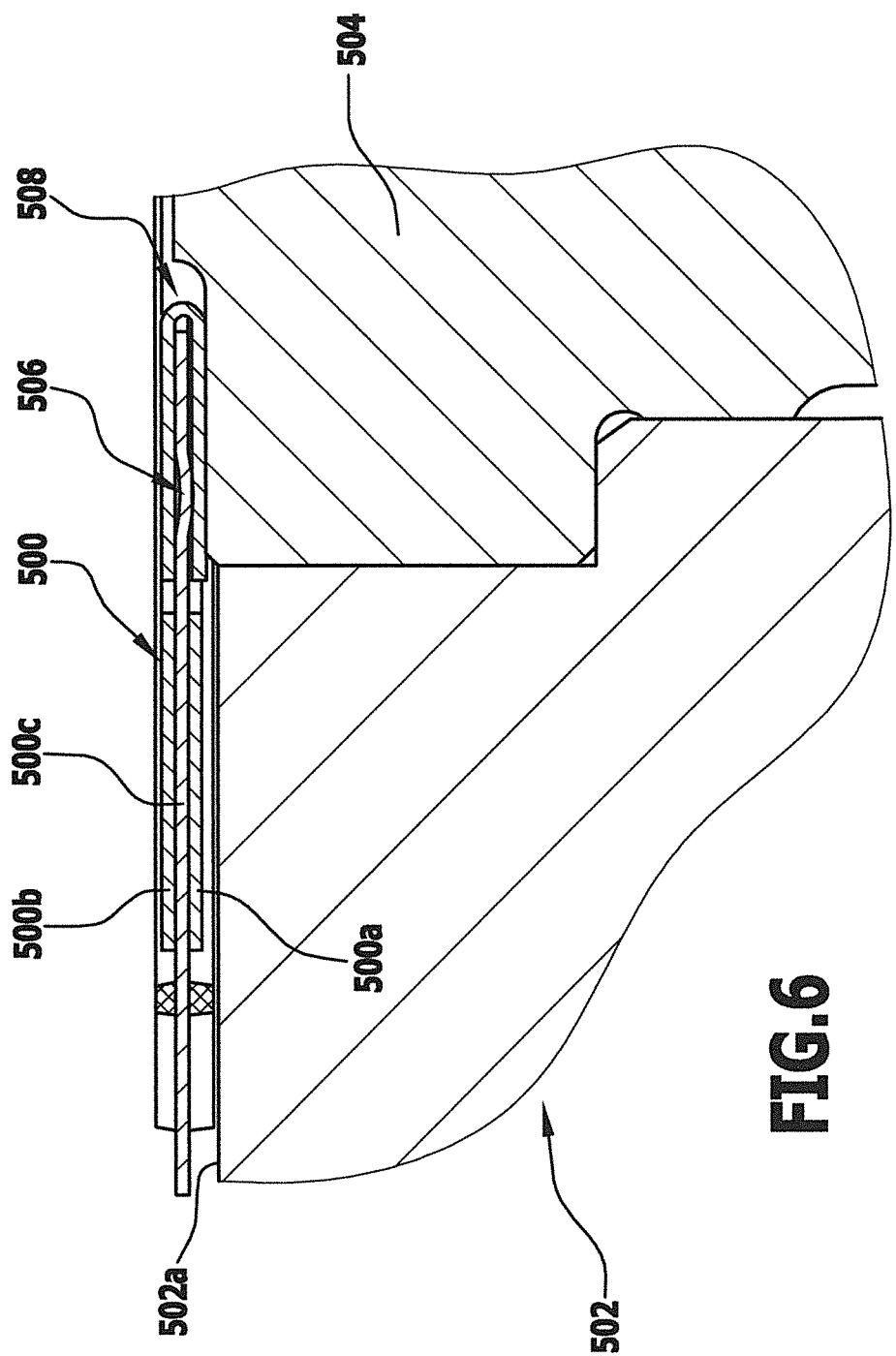
FIG. 6 is a section taken through a portion of the second embodiment serving to seal about a combustion chamber through-opening.

The purpose of FIG. 6 is only to demonstrate how a cylinder head gasket constructed in accordance with the invention can provide sealing around a combustion chamber through-opening, using a multi-layered cylinder head gasket 500 constructed in accordance with the invention and integrated in an engine equipped with cylinder liners.

FIG. 6 shows part of a cylinder block 502 and part of a cylinder liner 504 inserted therein, with the cylinder liner 504 surrounding a combustion chamber, not shown in FIG. 6 and in this section lying to the right of the cylinder liner 504, and projecting slightly above a sealing face 502*a* of the cylinder block 502.

The cylinder head gasket 500, again, has two gasket layers 500*a* and 500*b* and a gasket layer 500*c* that is interposed therebetween and configured in accordance with the invention, said gasket layer 500*c* being, above the cylinder liner 504, provided with a combustion chamber sealing bead 506 enclosing the combustion chamber.

Furthermore, the cylinder head gasket 500 has a so-called combustion chamber border 508 which is supported by the cylinder liner 504, encloses the combustion chamber in the shape of a circular ring and is formed by a circular ring-shaped sheet metal that has been folded such that the cross-section of the combustion chamber border 508 corresponds to that of a flat, horizontal U so that the combustion chamber border 508 can be held by the gasket layer 500*c*.

Figure 7:
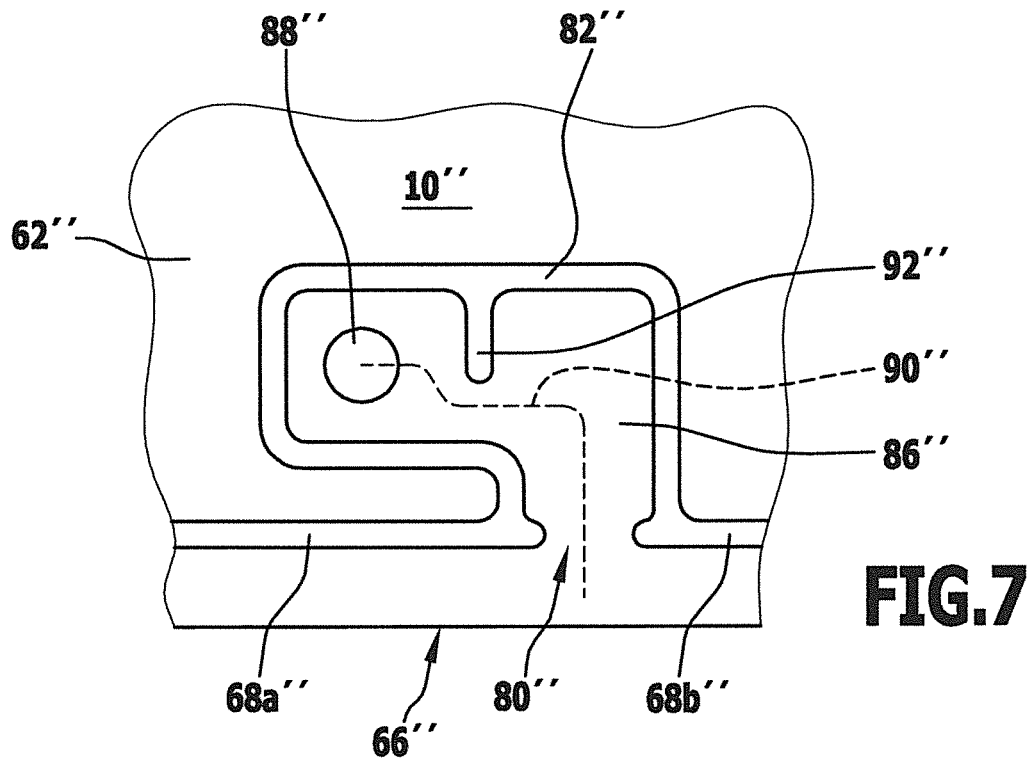
FIGS. 7 to 9 show details of a third, fourth and fifth embodiment of the cylinder head gasket constructed in accordance with the invention, in a view corresponding to FIG. 3.

FIG. 7 shows a in a view corresponding to FIG. 3 a detail of a third embodiment of the cylinder head gasket constructed in accordance with the invention, this detail illustrating a second embodiment (to which appended claim 20 is directed) of the vent and drain device constructed in accordance with the invention.

Wherever possible, the same reference characters as in FIGS. 1 to 3 are used in FIG. 7, though double-primed. Furthermore, FIG. 7 shows no equivalent to the bolt hole 24 and the elastomeric sealing element 58 enclosing it of the first embodiment illustrated in FIGS. 1 to 3.

A first side 62" of a gasket layer 10" of the third embodiment of the cylinder head gasket constructed in accordance with the invention is likewise provided with a peripheral first elastomeric sealing element which corresponds to the sealing element 68 of the first embodiment and of which only the two end regions 68*a"* and 68*b"* forming a sealing line break 80" therebetween are depicted in FIG. 7.

The first side 62" of the gasket layer 10" is further provided with a second elastomeric sealing element 82" which extends continuously from approximately the left end of the sealing line break 80" in FIG. 7, merging into the sealing element end region 68*a"*, to approximately the right end of the sealing line break 80" in FIG. 7, merging into the sealing element end region 68*b"*, and forms a boundary of a first gasket layer region 86"—except for the area of the sealing line break 80", where the gasket layer region 86" terminates. Within the latter, the gasket layer 10" is provided with a first vent hole 88" and, on its first layer side 62", with a projection 92" of in particular rib-like configuration, said projection 92" preferably also consisting of an elastomeric material and merging at its one end, the upper end thereof in FIG. 7, into the second sealing element 82".

As can be seen from FIG. 7, the second sealing element 82" extends about the first gasket layer region 86" and relative to the sealing line break 80" in accordance with the invention in a course such and the sealing line break 80" is arranged and oriented such that a fluid flow path 90" indicated in broken lines in FIG. 7 and extending through the vent hole 88" to the sealing line break 80" has at least one change in direction, namely, besides the changes in direction located within the area of the vent hole 88", also at least the change in direction in the right-hand part of the first gasket layer region 86" in FIG. 7.

Thus, the first embodiment and the second embodiment of the vent and drain device constructed in accordance with the invention and illustrated in FIG. 3 and FIG. 7 respectively differ primarily in that in the second embodiment of FIG. 7, the first gasket layer region provided with the first vent hole is, outside the sealing line break 80", bounded only by a second sealing element 82".

Figure 8:
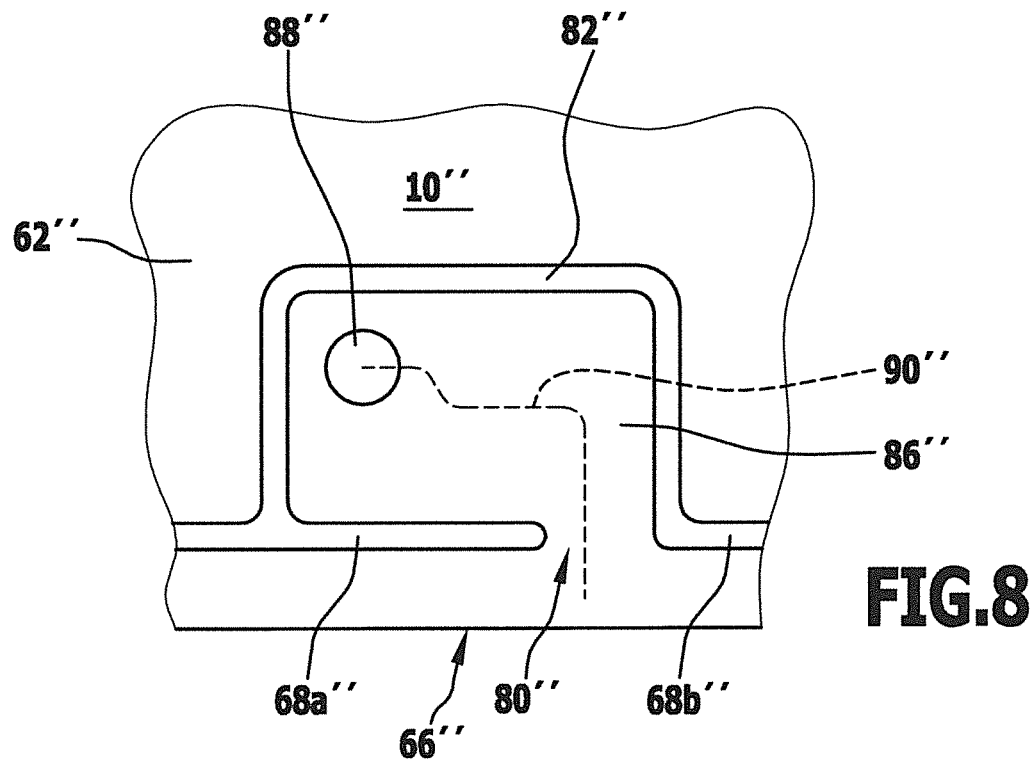

A third embodiment of the vent and drain device constructed in accordance with the invention is shown in FIG. 8, wherein the same reference characters as in FIG. 7 are used in FIG. 8 but the projection 92" has been omitted.

The third embodiment of the vent and drain device constructed in accordance with the invention and illustrated in FIG. 8 differs from that shown in FIG. 7 only in that the second sealing element 82" merges into the sealing element end region 68*a"* of the peripheral sealing element 68 at a location that is at a distance away from the sealing line break 80", as shown at the left in FIG. 8.

Figure 9:
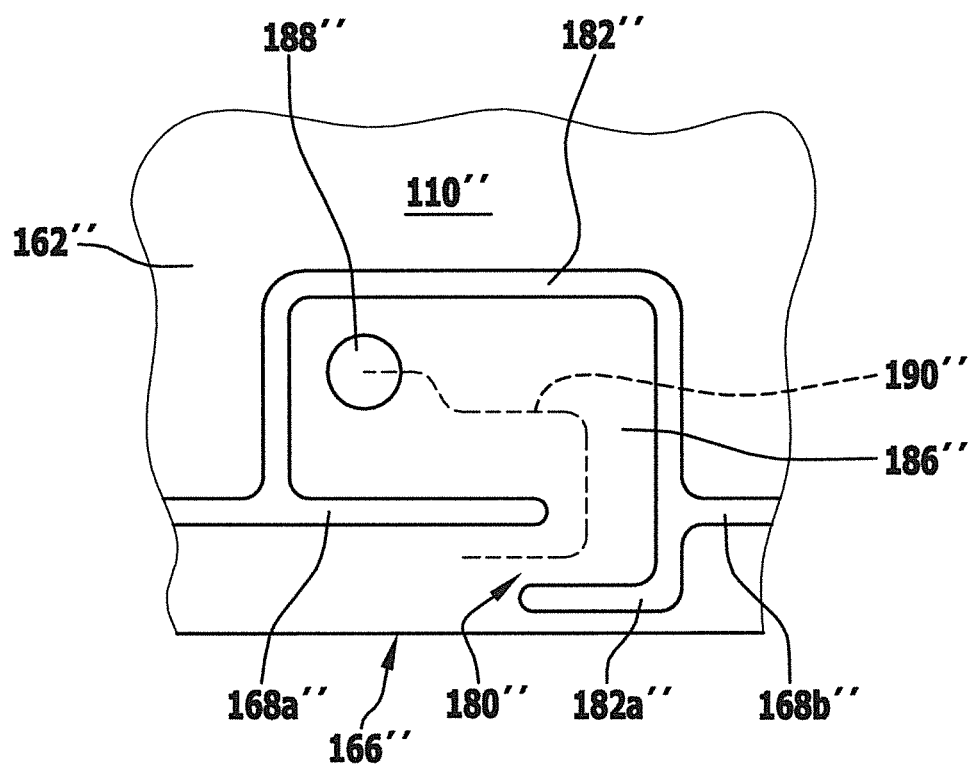

The same reference characters as in FIG. 8 are used in FIG. 9, but increased by 100.

The fourth embodiment of the vent and drain device constructed in accordance with the invention and shown in FIG.

9 differs from the embodiment of FIG. 8 primarily in the orientation and position of the sealing line break, designated by 180" in FIG. 9.

In the vent and drain device illustrated in FIG. 9, the sealing line break 180" is formed by two sealing element end regions, namely an end region 168a" of the peripheral first sealing element 68 and a sealing element end region designated by 182a" which can be regarded either as an end region of the second sealing element 182" or as part of the end region 168b" of the peripheral first sealing element 68.

Also in the case of the fourth embodiment of the vent and drain device constructed in accordance with the invention and shown in FIG. 9, the sealing element end regions forming the sealing line break, that is the sealing line break 180" in FIG. 9, overlap (as viewed from the outer perimeter edge 166" of the gasket layer 110"), similar to the first embodiment shown in FIG. 3.

Otherwise, in each of the four embodiments of the vent and drain device constructed in accordance with the invention, all of what has been said above with reference to one of the embodiments is equally applicable to the other of the embodiments to the extent that this is possible and meaningful.

Appended claim 20 encompasses all of the four embodiments of the vent and drain device constructed in accordance with the invention, appended claim 21 encompasses the embodiments in accordance with FIGS. 3, 8 and 9, while claim 22 is limited to embodiments which at least substantially correspond to FIG. 7.

Finally, it is to be noted that the advantageous configurations of the cylinder head gasket constructed in accordance with the invention, which are disclosed in claims 2 to 19, may in accordance with the invention be utilized alone, in combination or in every subcombination also in combination with the features of claim 20 to the extent that this is technically feasible and meaningful.

That which is claimed:

1. A cylinder head gasket comprising at least one metallic gasket layer that extends at least approximately over the whole cylinder head gasket and has two sides, an entirety of through-openings comprising at least one combustion chamber through-opening, at least one fluid through-opening for a liquid medium and bolt holes for passage therethrough of cylinder head bolts and has a peripheral outer margin, at least one first sealing element in said peripheral outer margin area for providing a seal on both sides of the gasket layer, wherein said at least one first sealing element in plan views of the gasket layer forms, on each of the two sides of the gasket layer, at least one first sealing line extending circumferentially about the gasket layer and surrounding the entirety of the through-openings, and wherein on at least one side of the gasket layer the first sealing line has a break forming a passageway for fluids through said first sealing line, said break being in communication with an outer perimeter margin of the gasket layer and the first sealing lines are otherwise closed in themselves, wherein the gasket layer has, on the side of the at least one first sealing element that faces away from the peripheral outer margin area of the gasket layer, at least one vent hole via which the two sides of the gasket layer intercommunicate, and wherein in a plan view of the gasket layer at least one first vent hole arranged adjacent to a first sealing line break is located in a first gasket layer region which is, on only a first side of the gasket layer, on both sides of the sealing line break, continuously bounded by a first sealing element and at least one second sealing element provided on the gasket layer, wherein when viewed in a plan view of the gasket layer, the first sealing element and the at least one second sealing element extend around said first gasket layer region in a course and the sealing line break is arranged such that a fluid flow path extending from the first vent hole to the sealing line break and the outer perimeter margin of the gasket layer has at least one change in direction in a fluid flow path section extending between the first vent hole and the sealing line break.

2. The cylinder head gasket in accordance with claim 1, wherein when the cylinder head gasket is uncompressed, the first and second sealing elements are at least approximately of the same height.

3. The cylinder head gasket in accordance with claim 1, wherein there is provided in the first gasket layer region, on the first side of the gasket layer, at least one projection which in a plan view of the gasket layer extends from at least one of the first and the second sealing element and effects a further, at least partial change in direction of the fluid flow path, said projection preferably being lower than at least one of the first and the second sealing element.

4. The cylinder head gasket in accordance with claim 3, wherein in the first gasket layer region, between the at least first vent hole and the sealing line break when viewed in a plan view of the gasket layer, the gasket layer is, on the first side thereof, provided with a flat overlay above which the first and the second sealing element project.

5. The cylinder head gasket in accordance with claim 4, wherein the overlay has also the projection projecting above it.

6. The cylinder head gasket in accordance with claim 4, wherein the projection is an elastomeric element which is integrally formed on the overlay in particular.

7. The cylinder head gasket in accordance with claim 4, wherein at least one fluid flow channel is provided which is formed by the overlay and which, when seen in a plan view of the gasket layer, has at least one change in direction.

8. The cylinder head gasket in accordance with claim 7, wherein when seen in a plan view of the gasket layer, a change in direction of the fluid flow channel is adjacent to a free end of the at least one projection.

9. The cylinder head gasket in accordance with claim 1, wherein in the first gasket layer region, between the at least first vent hole and the sealing line break when viewed in a plan view of the gasket layer, the gasket layer is, on the first side thereof, provided with a flat overlay above which the first and the second sealing element project.

10. The cylinder head gasket in accordance with claim 9, wherein the overlay is an elastomeric element which is integrally formed on the gasket layer.

11. The cylinder head gasket in accordance with claim 9, wherein at least one fluid flow channel is provided which is formed by the overlay and which, when seen in a plan view of the gasket layer, has at least one change in direction.

12. The cylinder head gasket in accordance with claim 1, wherein the first vent hole is directly adjacent to the first sealing element.

13. The cylinder head gasket in accordance with claim 1, wherein the at least one first sealing element is an elastomeric sealing element which is integrally formed on the gasket layer.

14. The cylinder head gasket in accordance with claim 1, wherein the at least one second sealing element is an elastomeric sealing element which is integrally formed on the gasket layer.

15. The cylinder head gasket in accordance with claim 1, wherein the elastomeric elements are contiguous with one another and are applied, in particular integrally injection-molded, as a unit to the first side of the gasket layer.

16. The cylinder head gasket in accordance with claim 1, wherein the cylinder head gasket is configured as a gasket for a single cylinder and has only a single combustion chamber through-opening.

17. The cylinder head gasket in accordance with claim 1, wherein the cylinder head gasket has only a single metallic gasket layer.

18. The cylinder head gasket in accordance with claim 1, wherein the cylinder head gasket has at least one further metallic gasket layer.

19. The cylinder head gasket in accordance with claim 18, wherein the cylinder head gasket has at least two further gasket layers having the gasket layer provided with the first and the second sealing element arranged therebetween.

20. The cylinder head gasket in accordance with claim 1, wherein the gasket layer, when viewed in a plan view thereof, has a second gasket layer region which is spaced apart from the first gasket layer region and in which at least one second vent hole of the gasket layer is located, wherein on the other, second side of the gasket layer, the sealing line of the at least one first sealing element has a second sealing line break to which the second vent hole is adjacent, and wherein the second gasket layer region is, on only the second side of the gasket layer, on both sides of the second sealing line break, continuously bounded by a first sealing element and at least one third sealing element provided on the second side of the gasket layer, wherein in a plan view of the gasket layer the first sealing element and the at least one third sealing element extend around the second gasket layer region in a course and the second sealing line break is arranged such that a fluid flow path extending from the second sealing line break to the second vent hole has at least one change in direction.

21. The cylinder head gasket in accordance with claim 1, wherein the gasket layer has at least one further vent hole outside of the gasket layer region bounded by sealing elements, said further vent hole being located within the part of the gasket layer that is enclosed by the at least one first sealing element.

22. A cylinder head gasket comprising at least one metallic gasket layer that extends at least approximately over the whole cylinder head gasket and has two sides, an entirety of through-openings comprising at least one combustion chamber through-opening, at least one fluid through-opening for a liquid medium and bolt holes for passage therethrough of cylinder head bolts and has a peripheral outer margin area, at least one first sealing element in said peripheral outer margin area for providing a seal on both sides of the gasket layer, wherein said at least one first sealing element in plan views of the gasket layer forms, on each of the two sides of the gasket layer, at least one first sealing line extending circumferentially about the gasket layer and surrounding the entirety of the through-openings, and wherein on at least one side of the gasket layer the first sealing line has a break forming a passageway for fluids through said first sealing line, said break being in communication with an outer perimeter margin of the gasket layer and the first sealing lines are otherwise closed in themselves, wherein the gasket layer has, on the side of the at least one first sealing line that faces away from the peripheral outer margin area of the gasket layer, at least one vent hole via which the two sides of the gasket layer intercommunicate, and wherein in a plan view of the gasket layer at least one first vent hole arranged adjacent to a first sealing line break is located in a first gasket layer region which is completely located on the side of the at least one first sealing line that faces away from the peripheral outer margin of the gasket layer and is, on only a first side of the gasket layer, when viewed in a plan view on said first side, continuously surrounded, except for the first sealing line break, by at least one elongate boundary sealing line which is, at least over part of its length, formed by at least one second sealing element that is provided on the gasket layer and merges on both sides of the first sealing line break into the at least one first sealing element, and wherein the sealing line break is arranged such that a fluid flow path extending from the first vent hole to the sealing line break and the outer perimeter margin of the gasket layer has at least one change in direction in a fluid flow path section extending between the first vent hole and the sealing line break.

23. The cylinder head gasket in accordance with claim 22, wherein the boundary sealing line is formed by the at least one second sealing element and the at least one first sealing element.

24. The cylinder head gasket in accordance with claim 22, wherein the boundary sealing line is formed only by the at least one second sealing element.

\* \* \* \* \*